(12) United States Patent
Nagase et al.

(10) Patent No.: US 7,657,370 B2
(45) Date of Patent: Feb. 2, 2010

(54) NAVIGATION APPARATUS, NAVIGATION SYSTEM, AND NAVIGATION SEARCH METHOD

(75) Inventors: Kenji Nagase, Okazaki (JP); Kazutaka Yoshikawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 748 days.

(21) Appl. No.: 10/857,882

(22) Filed: Jun. 2, 2004

(65) Prior Publication Data
US 2005/0010360 A1 Jan. 13, 2005

(30) Foreign Application Priority Data
Jul. 10, 2003 (JP) .............................. 2003-195323

(51) Int. Cl.
G01C 21/26 (2006.01)
(52) U.S. Cl. ................. 701/207; 701/201; 701/204; 701/210; 340/995.19; 340/995.13
(58) Field of Classification Search ................. 701/210, 701/201, 204, 207; 340/995.19, 995.13
See application file for complete search history.

(56) References Cited

U.S. PATENT DOCUMENTS

| | | | |
|---|---|---|---|
| 6,101,443 A * | 8/2000 | Kato et al. ................. 701/210 |
| 6,185,503 B1 * | 2/2001 | Sumizawa ................. 701/209 |
| 6,233,517 B1 * | 5/2001 | Froeberg ................. 701/117 |
| 6,317,686 B1 * | 11/2001 | Ran ................. 701/210 |
| 6,480,783 B1 * | 11/2002 | Myr ................. 701/117 |
| 7,050,904 B2 * | 5/2006 | Powell et al. ................. 701/201 |
| 2002/0016670 A1 * | 2/2002 | Powell et al. ................. 701/209 |
| 2005/0021223 A1 * | 1/2005 | Heaps et al. ................. 701/200 |

FOREIGN PATENT DOCUMENTS

| | | |
|---|---|---|
| JP | A-04-172294 | 6/1992 |
| JP | A-08-287393 | 11/1996 |
| JP | A-2000-285362 | 10/2000 |
| JP | A 2002-148067 | 5/2002 |
| JP | A-2002-286468 | 10/2002 |
| JP | A-2004-301677 | 10/2004 |

* cited by examiner

Primary Examiner—Khoi Tran
Assistant Examiner—Nikhil Sriraman
(74) Attorney, Agent, or Firm—Oliff & Berridge, PLC

(57) ABSTRACT

A navigation apparatus searches for a route from a starting point to a destination wherein, predicted traffic information is associated with each of at least one links within any one of a plurality of predefined areas based on a time at which, according to the predicted traffic information, a vehicle traveling the route is expected to arrive within that predefined area.

17 Claims, 12 Drawing Sheets

TRAFFIC INFORMATION TABLE

| | | TRAFFIC INFORMATION LINKED AREA | | | | | | | |
|---|---|---|---|---|---|---|---|---|---|
| | | A-1 | A-2 | A-3 | ... | B-1 | B-2 | B-3 | ... | C-n |
| DESTINATION AREA | NONE | ((15, 3), (10, 3)) | ((10, 2), (5, 2)) | ((10, 2),(CURRENTLY PASSING,2)) | | ((10, 3), (-, -)) | ((5, 2), (-, -)) | ((CURRENTLY PASSING,1),(CURRENTLY PASSING,1)) | ... | ((45, s), (45, t)) |
| | A-1 | ((15, 2), (10, 4)) | ((10, 2), (5, 3)) | ((10, 2),(CURRENTLY PASSING,2)) | | ((10, 2), (-, -)) | ((5, 2), (-, -)) | ((CURRENTLY PASSING,1),(CURRENTLY PASSING,1)) | | ((45, x), (45, y)) |
| | A-2 | ... | ... | ... | | ... | ... | ... | | ... |
| | ... | | | | | | | | | |
| | B-1 | ... | | | | | | | | |
| | ... | | | | | | | | | |
| | C-n | ((15, 3), (10, 5)) | ((10, 2), (5, 4)) | ((10, 2),(CURRENTLY PASSING,3)) | | ((10, 3), (-, -)) | ((5, 2), (-, -)) | ((CURRENTLY PASSING,1),(CURRENTLY PASSING,1)) | | ((45, s), (45, t)) |
| | ... | | | | | | | | | |

FIG. 6

NAVIGATION APPARATUS, NAVIGATION SYSTEM, AND NAVIGATION SEARCH METHOD

INCORPORATION BY REFERENCE

The disclosure of Japanese Patent Application No. 2003-195323 filed on Jul. 10, 2003, including the specification, drawings and abstract is incorporated herein by reference in its entirety.

BACKGROUND OF THE INVENTION

1. Field of Invention

The present invention relates to a navigation apparatus capable of searching for an optimum route along which to drive a vehicle, and also to a navigation system including such a navigation apparatus.

2. Description of Related Art

A navigation apparatus is known which displays a route from a start point to a destination point and provides navigation information along the route making it possible for a user to easily navigate a vehicle.

In such a navigation apparatus, the current position of the vehicle is detected by using a GPS, or the like, and the detected current position is displayed together with a road map on a display. A route from a starting point to a destination is searched for, and navigation information resulting from the search is provided. The route search is performed, for example, by means of the Dijkstra method or a similar method. That is, in the navigation apparatus, the costs (scores) for routes from the start point to an arbitrary point are calculated on the basis of current road traffic information (at a time when searching is performed) and also on the basis of a distance from the current position to the arbitrary point. The distance from the current position to the arbitrary point is determined by using map data stored in the navigation apparatus or supplied from an external data storage device. After the calculation of the costs is completed for all possible routes to the destination, the route having the minimum cost is selected as an optimum route from the current position to the destination.

The above-described navigation apparatus is capable of acquiring road traffic information indicating the current status in terms of congestion and/or traffic restriction information, searching for a shortest route, and calculating a predicted time needed to reach a destination.

A navigation apparatus has been proposed that is capable of searching for road traffic information associated with a particular date/time at which to start driving a vehicle. The road traffic information is predicted using statistically predicted traffic information determined from past road traffic information indicating the congestion status or the like (Japanese Unexamined Patent Application Publication No. 2002-148067). This makes it possible to determine, in a more reliable fashion, a shortest route and a predicted time needed to reach a destination on a particular date/time at which to start driving.

SUMMARY OF THE INVENTION

However, according to the above-described proposed navigation apparatus, a search for a route is performed using road traffic information indicating traffic conditions on a particular date and at a particular time when driving of the vehicle is started. However, traffic conditions can change as time elapses. In other words, as the vehicle approaches the destination the traffic conditions may be substantially different than when driving was started. Thus, a search for a route is performed without taking into account a possible change in traffic conditions that can occur while traveling from a start point to a destination.

In view of the above, various exemplary embodiments of this invention provide a navigation apparatus capable of reliably searching for a route by taking into account time-dependent changes in traffic conditions that can occur while traveling. Various exemplary embodiments of the invention also provide a navigation system using such a navigation apparatus.

Accordingly, various exemplary embodiments of the invention provide a navigation apparatus, including at least one memory that is capable of storing a plurality of traffic information tables, the traffic information tables including a length of time required to travel from a predefined one of a plurality of predefined areas to each remaining one of the plurality of predefined areas during one of a plurality of predefined time periods; and is capable of storing, for each of the plurality of predefined time periods, predicted traffic information associated with each of at least one link within each predefined area; and at least one controller that is capable of selecting a traffic information table from the first plurality of traffic information tables, wherein the selected traffic information table includes as the predefined one of the plurality of predefined areas a predefined area containing a starting point and the selected traffic information table describes traffic information for a one of the plurality of predefined time periods in which traveling will start; and is capable of searching for a route from the starting point to a destination wherein, predicted traffic information is associated with each of the at least one links within any one of the plurality of predefined areas based on a time at which, according to the predicted traffic information, a vehicle traveling the route is expected to arrive within that predefined area Various exemplary embodiments of the invention provide a navigation apparatus, including at least one memory that is capable of storing a plurality of traffic information tables, the traffic information tables including a length of time required to travel from a predefined one of a plurality of predefined areas to each remaining one of the plurality of predefined areas during one of a plurality of predefined time periods; and at least one controller that is capable of searching for a facility; is capable of determining, as a target area, one of the plurality of predefined areas in which the searched for facility is located; is capable of selecting a traffic information table from the plurality of traffic information tables, wherein the selected traffic information table includes as the predefined one of the plurality of predefined areas a predefined area containing a starting point and the selected traffic information table describes traffic information for a one of the plurality of predefined time periods in which traveling will start; and is capable of outputting a length of time needed to reach the target area from the selected traffic information table Various exemplary embodiments of the invention provide a method for searching for a route, including producing a plurality of traffic information tables, wherein each of the produced traffic information tables includes a length of time required to travel from a predefined one of a plurality of predefined areas to each remaining one of the plurality of predefined areas during one of a plurality of predefined time periods; selecting a traffic information table from the plurality of produced traffic information tables, wherein the selected traffic information table includes as the predefined one of the plurality of predefined areas a predefined area containing a starting point of the route and the selected traffic information table describes traffic information for a one of the plurality of predefined time periods in which traveling of the route will start; and searching for the route from the starting point to a destination wherein, predicted traffic information is associated with each of the at least one links within any one of the plurality of predefined areas based on a time at which, according to the predicted traffic information, a vehicle traveling the route is expected to arrive within that predefined area Various exemplary embodiments of the invention provide a storage medium storing a set of program instructions executable on a data processing device and usable for searching for a route, the set of program instructions including instructions for producing a plurality of traffic information tables, wherein each of the produced traffic information tables includes a length of time required to travel from a predetermined one of a plurality of predefined areas to each remaining one of the plurality of predefined areas during one of a plurality of predefined time periods; instructions for storing the plurality of produced traffic information tables instructions for selecting a traffic information table from the plurality of stored traffic information tables, wherein the selected traffic information table includes as the predefined one of the plurality of predefined areas a predefined area containing a starting point of the route and the selected traffic information table describes traffic information for a one of the plurality of predefined time periods in which traveling of the route will start; and instructions for searching for the route from the starting point to a destination wherein, predicted traffic information is associated with each of the at least one links within any one of the plurality of predefined areas based on a time at which, according to the predicted traffic information, a vehicle traveling the route is expected to arrive within that predefined area

BRIEF DESCRIPTION OF THE DRAWINGS

Exemplary embodiments of the invention will now be described with reference to the accompanying drawings, wherein:

FIG. 6 is a diagram showing a traffic information table;

DETAILED DESCRIPTION OF EXEMPLARY EMBODIMENTS

A navigation system 1 according to an exemplary embodiment of the invention is described below with reference to FIGS. 1 to 12.

Figure 1:
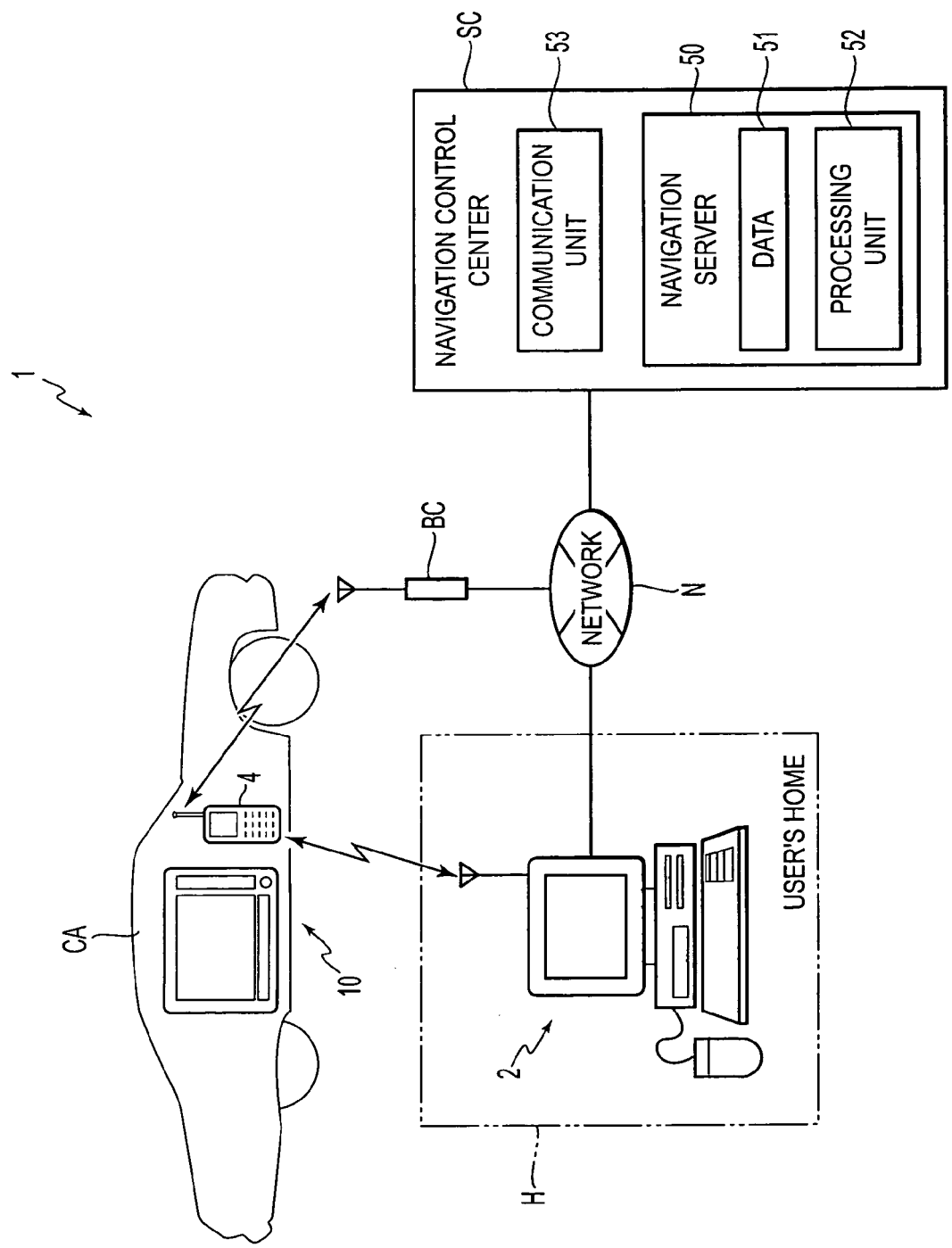
FIG. 1 is a diagram schematically showing a navigation system according to an exemplary embodiment of the invention.

As shown in FIG. 1, the navigation system 1 according to the present embodiment includes a navigation apparatus 10 installed on a vehicle CA, and a server device serving as a navigation control center (hereinafter, referred to as a navigation center) SC. The navigation apparatus 10 includes a mobile communication device 4.

The navigation apparatus 10 is connected with the navigation center SC via a base station antenna BC and a network N so that various kinds of information including route information and current position information may be transmitted between the navigation center SC and the navigation apparatus 10. Specifically, information indicating a current position and information indicating a selected destination may be transmitted as data in the form of, for example, a radio wave signal from an antenna of the mobile communication device 4 of the navigation apparatus 10. The radio wave signal may be received by the base station antenna BC and transmitted to the navigation center SC via the network N such as, for example, a telephone network. The navigation center SC may transmit data such as traffic information table data or statistically predicted traffic information data in the form of, for example, a radio wave signal from the base station antenna BC of the network N to the navigation apparatus 10.

A personal computer 2 located in, for example, a user's home H is connected to the navigation center SC via the network N. A keyboard, a mouse, and a monitor, and the like, may be connected to the personal computer 2. Thus, a user may input a destination and select a route by using, for example, the keyboard, the mouse, and/or the monitor of the personal computer at his/her home H to acquire, for example, information about a route to a destination, information indicating at what time to start, and other information before traveling to the destination. The personal computer 2 is capable of transmitting and/or receiving information to and/or from the navigation apparatus 10 via, for example, an antenna and a radio channel. The navigation center SC can transmit information about a route to a destination specified by the user to the personal computer 2 and further to the navigation apparatus 10 from the personal computer 2.

Figure 2:
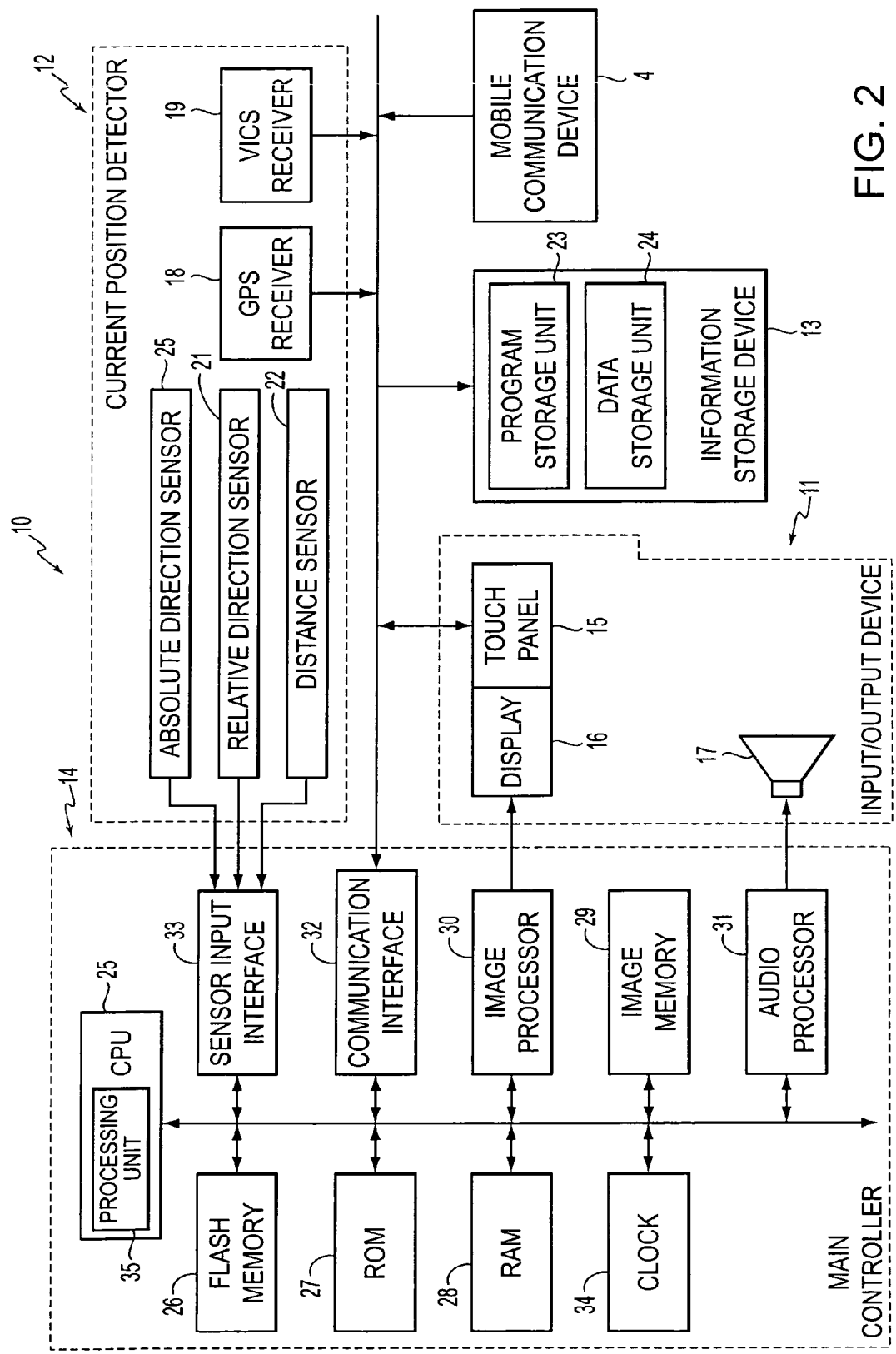
FIG. 2 is a block diagram showing a structure of a navigation apparatus.

The navigation apparatus 10 installed in the vehicle CA is described in detail below with reference to FIG. 2. As shown in FIG. 2, the navigation apparatus 10 may include an input/output device 11, a current position detector 12, an information storage device 13, and a main controller 14. The navigation apparatus 10 also includes a mobile communication device 4.

The input/output device 11 may be used to input, for example, a starting point, a destination, and/or a navigation command to the main controller 14. The input/output device 11 may also be used to output a sound and/or an image representing necessary information. The input/output device 11 may include a touch panel 15, a display 16 and/or a speaker 17.

The touch panel 15 may be a touch-sensitive and transparent panel disposed over the substantially entire surface of the display 16. For example, if a user touches the touch panel 15 with his/her finger at a particular point corresponding to a particular image displayed on a screen of the display 16, a signal related to the touched point may be output to the main controller 14. Touch switches or key switches (jog keys) may be formed on the display screen of the display 16. The touch panel 15 may be used to, for example, select a destination and/or input a command such as a route search command. Touching of the touch panel 15 may be sensed, for example, by a pressure sensor, an electrostatic touch sensor that senses an electrical signal caused by static electricity, or an optical sensor that senses an electrical signal generated by illumination of light.

Figure 5:
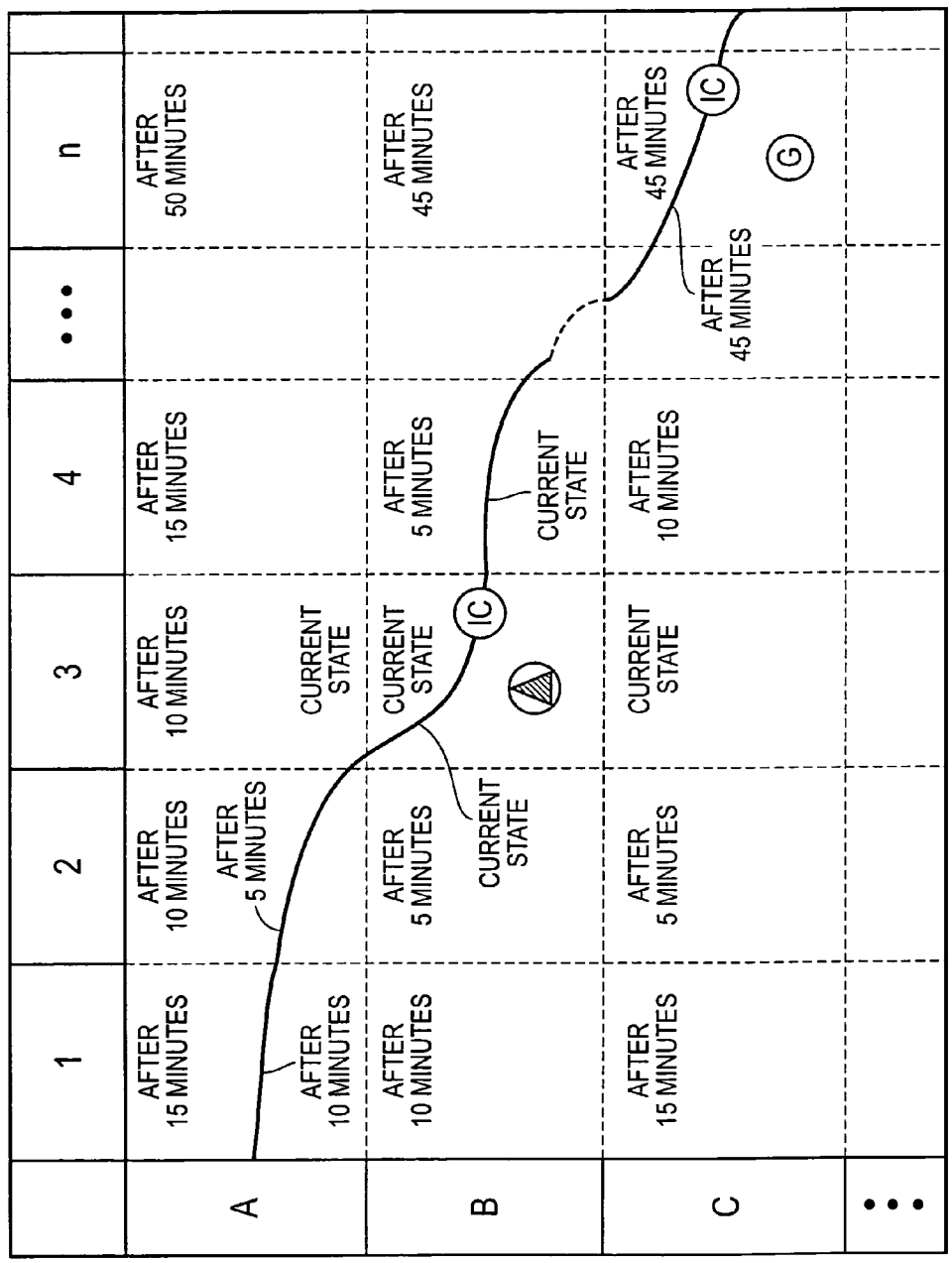
FIG. 5 is a diagram showing a traffic information table.

A color liquid crystal display may be used for the display 16 and may be disposed, for example, at a location close to a dashboard of the vehicle CA. The display 16 displays, for example, a map including the current position of the vehicle CA as navigation information, as shown in FIG. 5. The speaker 17 may be used to provide navigation information in the form of, for example, a voice.

The current position detector 12 is a device for detecting the current position of the vehicle and/or receiving information indicating the current position of the vehicle. The current position detector 12 may include, for example, a GPS receiver 18, a VICS (Vehicle Information and Communication System) receiver 19, an absolute direction sensor 20, a relative direction sensor 21, and a distance sensor 22. The VICS is a system that transmits traffic information such as traffic congestion information and road traffic restriction information to vehicles CA.

The GPS receiver 18 can detect the current position, the direction of the vehicle, and the running speed of the vehicle CA by using the GPS (Global Positioning System). The VICS receiver 19 can receive road information transmitted from, for example, a data transmission station, a FM multiplex broadcast station, and/or a beacon (a transmitter disposed on a road to transmit, to vehicles CA, traffic information such as traffic congestion information and/or road traffic restriction information in a small area). The absolute direction sensor 20 may be, for example, a terrestrial magnetism detector. The relative direction sensor 21 may be, for example, a steering sensor and a gyroscope. The distance sensor 22 can calculate the driving distance from the number of revolutions of a wheel.

The information storage device 13 is formed of, for example, a hard disk and has a program storage unit 23 for storing, among other things, a navigation program and a data storage unit 24 for storing data.

The navigation program that may be stored in the program storage unit 23 can include a map drawing module, a route searching module, a route navigation module, a current position calculation module, and a destination location setting module. That is, in the program storage unit 23, program modules for searching a route to a destination, for searching a route to an arbitrary point on a route to a destination, displaying image/text navigation information, and/or outputting voice navigation information may be stored.

Figure 3:
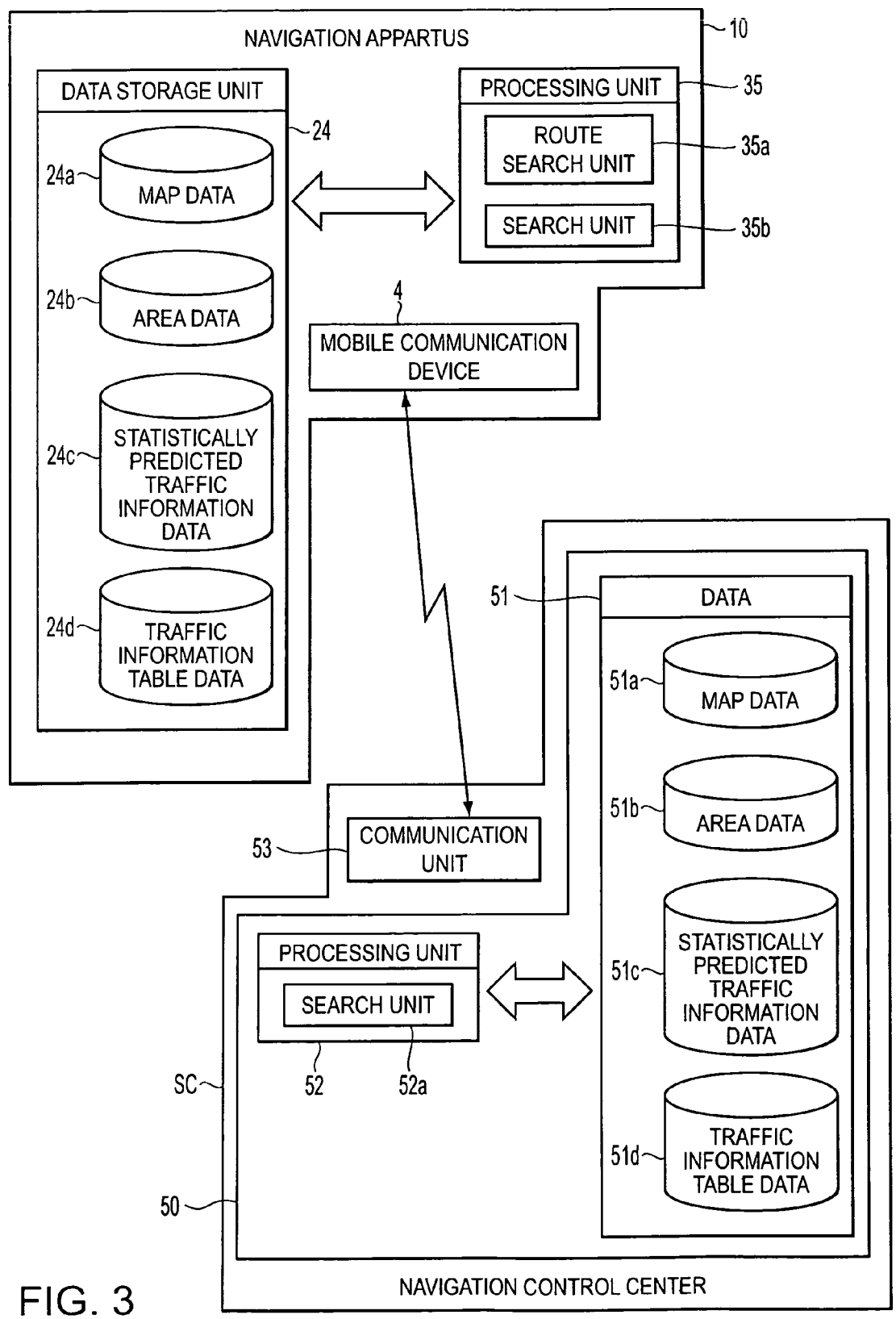
FIG. 3 is a block diagram showing a structure of a navigation system.

The data stored in the data storage unit 24 can include data used in the execution of the navigation program stored in the program storage unit 23 and/or display information necessary for providing navigation information including map information. Specifically, as shown in FIG. 3, the data stored in the data storage unit 24 can include map data 24a, area data 24b, statistically predicted traffic information data 24c, and traffic information table data 24d.

The map data 24a can include road map data, town map data, and/or building shape map data. The area data 24b can include latitudes and longitude data indicating location information and/or associated information related to locations indicated by the location information. Specifically, the area data 24b can include road data, parking lot data, intersection data, node data, link data, photograph data, and/or registered point data.

As used herein, the term "node" is used to describe various identifiable points within the area data 24b used in searching for a route such as, for example, intersections, exit ramps, on-ramps, or any other identifiable points within the data. The term "link" describes the various routes, such as roads, that connect the various nodes. Typically a searched for route comprises a number of links that connect a number of nodes between a starting point and a destination.

The area data 24b can also include image data, such as mark data displayed on a map during route navigation. The area data 24b can also include, as guidance data, destination data and/or destination related data. The statistically predicted traffic information data 24c stored in predicted traffic information storage means can include predicted traffic information produced from statistical data of past traffic information. The predicted traffic information is described for each link in each of a plurality of predefined areas for a predefined time period. The traffic information table data 24d can include a total traffic information table Ta that will be described later.

The main controller 14 can include, for example, a CPU (Central Processing Unit) 25, a flash memory 26, a ROM 27, a RAM 28, an image memory 29, an image processor 30, an audio processor 31, a communication interface 32, a sensor input interface 33, and a clock 34.

The CPU 25 may perform various kinds of calculations and processing. The CPU 25 can include a processing unit 35. As shown in FIG. 3, the processing unit 35 includes a route search unit 35a and a search unit 35b.

The route search unit 35a may search for a route in accordance with the navigation program read from the program storage unit 23 of the information storage device 13. Specifically, the route search unit 35a can calculate the current position of the vehicle CA from current position data and can search for a route on the basis of information indicating the current position and a destination. The route search unit 35a can also perform a route navigation process in which a map may be displayed on the display screen of the display 16, and the current position of the vehicle CA and/or necessary marks may be displayed on the map.

The search unit 35b can select from a plurality of traffic information tables, a traffic information table to be used. The traffic information table to be used will include a start area where a current position of the vehicle CA is located and traffic information at a time when the vehicle CA start traveling. The search unit 35b can also search for particular data from the map data 24a, the area data 24b, and/or the statistically predicted traffic information data 24c stored in the data storage unit 24 of the information storage device 13.

The flash memory 26 can store the navigation program read from the program storage unit 23 of the information storage device 13. The ROM 27 can store a program for checking and updating the navigation program stored in the flash memory 26. The RAM 28 is capable of temporarily storing, for example, data such as coordinates of a specified destination, navigation information associated with a selected route, and/or intermediate data in various processes.

The image memory 29 can store image data such as map data to be displayed on the display 16. In accordance with a display control signal output from the CPU 25, the image processor 30 can read image data from the image memory 29, perform image processing on the image data, and display the resultant image data on the display 16.

In accordance with an audio output control signal supplied from the CPU 25, the audio processor 31 can convert audio information included in the navigation information into an analog signal and supply the resultant analog signal to the speaker 17. For example, the audio processor 31 can synthesize a voice indicating a phrase, a sentence, or a sound to be used to aid in navigation from data read from the information storage device 13, and the audio processor 31. Then, the audio processor 31 can convert the resultant voice/sound into an analog signal.

The communication interface 32 can serve as a communication interface between the main controller 14 and other devices, such as the touch panel 15 of the input/output device 11, the GPS receiver 18 of the current position detector 12, the VICS receiver 19, the information storage device 13, and/or the mobile communication device 4. The sensor input interface 33 can capture sensor signals output from the absolute direction sensor 20, the relative direction sensor 21, and/or the distance sensor 22 of the current position detector 12. The clock 34 can output a date and/or a time written in internal dialog information.

In accordance with route navigation information associated with a route selected, the CPU 25 can display various screens that may be used to aid in route navigation on the display 16 and/or can output a voice communicating route navigation information from the speaker 17. The CPU 25 can display a screen on the display 16 in accordance with a command issued by a user by operating the touch panel 15 formed on the display 16.

The mobile communication device 4 is capable of performing radio communication with an external apparatus such as, for example, the navigation center SC or the personal computer 2. For example, a portable telephone or a radio LAN device may be used as the mobile communication device 4.

The navigation center SC is described below with reference to FIGS. 1, 3, and 4. As shown in FIG. 1, the navigation center SC may include a navigation server 50 and a communication unit 53. The navigation server 50 may include a data storage unit 51 and a processing unit 52.

The data storage unit 51 can store the navigation program and/or data. The navigation program can include a map drawing module, a route searching module, a route navigation module, a current position detection module, and/or a destination setting module. That is, the navigation program can include program modules for searching for a route to a destination, a route to an arbitrary point on a route to a destination, displaying image/text navigation information, and/or outputting voice navigation information. Based on, for example, the program modules, the current position, the destination, and way points may be set, a route from the current position to the destination through the way points may be searched for, a map may be displayed, map matching may be performed, and a voice phrase may be output with proper timings to provide navigation information along the route.

The data that can be stored in the storage unit 51 can include data used in execution of the navigation program and display information necessary in providing navigation information including map information. Specifically, as shown in FIG. 3, the data can include map data 51*a*, area data 51*b*, statistically predicted traffic information data 51*c*, and traffic information table data 51*d*.

The map data 51*a* can include road map data, town map data, and/or building shape map data. The area data 51*b* can include latitudes and longitude data indicating location information and associated information related to locations indicated by the location information. Specifically, the area data 51*b* can include road data, parking lot data, intersection data, node data, link data, photograph data, and/or registered point data. The area data 51*b* can also include, as guidance data, destination data and destination-related data. Note that, according to the present exemplary embodiment, the map data 51*a* and the area data 51*b* are typically stored in advance before searching is performed. Furthermore, the map data 51*a* and area data 51*b* can be newly stored or updated in accordance with information input at the navigation center SC. The statistically predicted traffic information data 51*c* can include predicted traffic information produced from statistical data of past traffic information. The traffic information table data 51*d* can include a total traffic information table Ta that will be described later.

As shown in FIG. 3, the processing unit 52 may include a search unit 52*a*. The search unit 52*a* can store a program for searching the statistically predicted traffic information data 51*c* or the traffic information table data 51*d* stored in the data storage unit 51.

The navigation server 50 is capable of searching for a route in accordance with the navigation program. Specifically, the navigation server 50 can calculate the current position of the vehicle CA from the current position data received from the navigation apparatus 10 and can search for a route on the basis of information indicating the current position and a destination.

Figure 4:
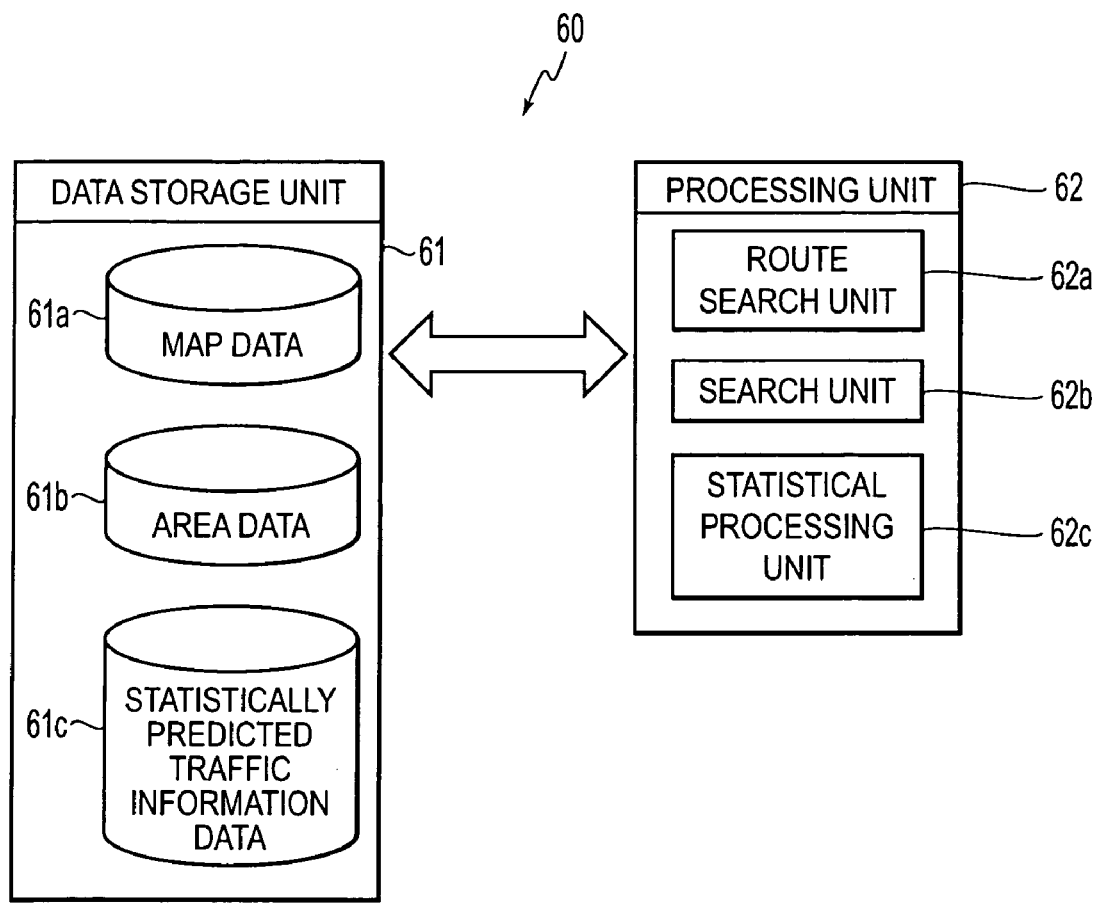
FIG. 4 is a block diagram showing a structure of a table data generator.

The total traffic information table Ta described in the traffic information table data 24*d* or described in the traffic information table data 51*d* can be produced, for example, by a table data generator 60 shown in FIG. 4. The table data generator 60 can produce table data and may include a data storage unit 61 and a processing unit 62.

The data storage unit 61 can store data such as map data 61*a*, area data 61*b*, and statistically predicted traffic information data 61*c*. The map data 61*a* is similar to the map data 24*a* and 51*a* described above. The area data 61*b* is similar to the area data 24*b* and 51*b* described above. The statistically predicted traffic information data 61*c* is similar to the statistically predicted traffic information data 24*c* and 51*c* described above.

The processing unit 62 may include a route search unit 62*a*, a search unit 62*b*, and a statistical processing unit 62*c*. The route search unit 62*a* can search for a route in accordance with the navigation program. The search unit 62*b* can search for data on the basis of the map data 61*a*, the area data 61*b*, and/or the statistically predicted traffic information data 61*c* stored in the data storage unit 61. The statistical processing unit 62*c* can perform statistical processing on traffic information.

According to the present exemplary embodiment, the navigation server 50 in the navigation center SC can also function as the table data generator 60. That is, the data storage unit 51 of the navigation server 50 can function as the data storage unit 61 of the table data generator 60, and/or the processing unit 52 of the navigation server 50 can function as the processing unit 62 of the table data generator 60. The navigation apparatus 10 and the navigation center SC described above form the navigation system 1.

The traffic information tables T forming the total traffic information table Ta are described below with reference to FIGS. 5-8. As shown in FIG. 5, a given particular area is divided into zones (zones 1 to n in the specific example shown in FIG. 5) in a horizontal direction by vertical boundaries at equal intervals and into zones (zones A to C in the specific example shown in FIG. 5) in a vertical direction by horizontal boundaries at equal intervals. Thus, the particular area is divided into an array of subareas. Each of those areas can be assigned an identification number such as subarea A-1 or subarea C-n. Searching for a route can be performed in or across any of those subareas. Herein, those subareas are referred to as traffic information service areas (also referred to simply as areas).

FIG. 6 shows a traffic information table. $T_B$-3 for an area B-3 at a particular time. The traffic information table $T_B$-3 shown in FIG. 6 has traffic information fields corresponding to areas obtained by dividing the original particular area. Traffic information $((t_1, n_1), (t_2, n_2))$ associated with each area is described in each corresponding traffic information field. Traffic information $(t_1, n_1)$ is traffic information for a case in which general roads other than toll roads are used. Traffic information $(t_2, n_2)$ is traffic information for a case in which toll roads (expressways) are used. That is, traffic information $((t_1, n_1), (t_2, n_2))$ associated with each area can include traffic information $(t_1, n_1)$ for the case in which general roads are used and traffic information $(t_2, n_2)$ for the case in which toll roads are used. The traffic information associated with each area may include necessary times $t_1$ and $t_2$ indicating times needed to reach that area and also may include usage priority levels $n_1$ and $n_2$ indicating priorities with which to use the traffic information associated with that area. Times described in each area of the diagram shown in FIG. 5 can be based on the data described in the traffic information table $T_B$-3 shown in FIG. 6.

The traffic information $((t_1, n_1), (t_2, n_2))$ is explained in further detail below. When general roads are used, each area is passed through after passage of a time indicated by a necessary time $t_1$ described in a traffic information field corresponding to that area. On the basis of this necessary time $t_1$ and taking into account the distance from the start area to each area, the usage priority level $n_1$ of each area is determined. Specifically, after calculating the necessary times $t_1$ for all areas, a route that requires a shortest travel time from the start area B-3 to a destination area is assigned "1" as the usage priority level. The necessary times $t_2$ and the usage priority levels $n_2$ are determined in a similar manner for the traffic information $(t_2, n_2)$ when toll roads are used.

When no destination area is specified for the start area B-3, the necessary times $t_1$, and $t_2$ indicate the averages of necessary times needed from arbitrary points in the start area B-3 to arbitrary points in each area. The usage priority levels $n_1$ and $n_2$ may be determined on the basis of the distance from the start area B-3 and the necessary times $t_1$ and $t_2$ from the start area B-3. The values of the usage priority levels $n_1$ and $n_2$ may be determined such that traffic information with a usage priority level having a smaller value represents a higher priority compared to traffic information with a usage priority level having a greater value.

When a particular area is specified as the destination area for the start area B-3, the necessary times $t_1$ and $t_2$ for each area may be determined such that various routes from the start area B-3 to a point in the destination area are drawn, and the averages of necessary times needed to pass through each area after starting from the start area B-3 along the various routes are calculated. For areas that are not passed through by any route from the start area B-3 to the destination area, the same traffic information is used as that when no destination area is specified. The usage priority levels $n_1$ and $n_2$ of each area may be determined by taking into account the possibility that some of routes from the start area to the destination area are included in each area and the distances of routes, in addition to the factors taken into account in the case in which no destination area is specified.

The above-described necessary times $t_1$ and $t_2$ may be calculated from the statistically predicted traffic information data 61c (51c) supplied from the table data generator 60 (the navigation server 50) while time-sliding the statistically predicted traffic information associated with respective areas starting from the start area B-3. Herein, time-sliding refers to applying statistically predicted traffic information defined for times at which respective areas are predicted to be reached, when the necessary times $t_1$ and $t_2$ for each area are determined by sequentially adding necessary times $t_1$ and $t_2$ for an area to necessary times for adjacent areas.

Specifically, as for the necessary times $t_1$ and $t_2$ for the start area B-3, the necessary times $t_1$ and $t_2$ obtained from the statistically predicted traffic information in the "current state" may be employed, and the necessary times $t_1$ and $t_2$ for areas (such as areas A-2, B-2, etc.) adjacent to the start area B-3 may be given by the necessary times needed to reach those areas from the start area B-3. The necessary times $t_1$ and $t_2$ for areas (such as areas A-1, B-1, etc.) adjacent to one of the previous adjacent areas may be determined by adding the time-slid necessary times from one of the previous adjacent areas to an area of interest to the already calculated necessary times from the start area B-3 to that one of the previous adjacent areas. Thus, the necessary times for any area may be determined by sequentially adding the necessary times, area by area, starting from the start area B-3 in the above-descried manner. When an area includes no toll roads, no traffic information $(t_2, n_2)$ is described.

Although in the present exemplary embodiment the traffic information table T associated with each area for a given start area may indicate calculated necessary times $t_1$ and $t_2$ from the start area to each area, arrival times at which each area is reached may also be calculated and described in the traffic information table T. In this case, arrival times are determined by adding the necessary times of each area to times described in the traffic information table T.

The usage priority levels $n_1$ and $n_2$ may be determined on the basis of the necessary times $t_1$ and $t_2$ from the start area B-3 to each area. Note that when the usage priority levels $n_1$ and $n_2$ are determined on the basis of the calculated necessary times $t_1$ and $t_2$, the route from the start point to the destination is taken into account.

Traffic information tables T are produced for all areas obtained by dividing the original particular area in a similar manner to the traffic information table $T_B$-3 described above. In the present exemplary embodiment, the particular area is the whole area of Japan. The traffic information table T may be produced separately for, for example, each day of the week. Thus, in the present exemplary embodiment, as many traffic information tables T are produced as the number of areas included in the whole area of Japan multiplied by the number of time periods multiplied by the number of days of the week.

Figure 7:
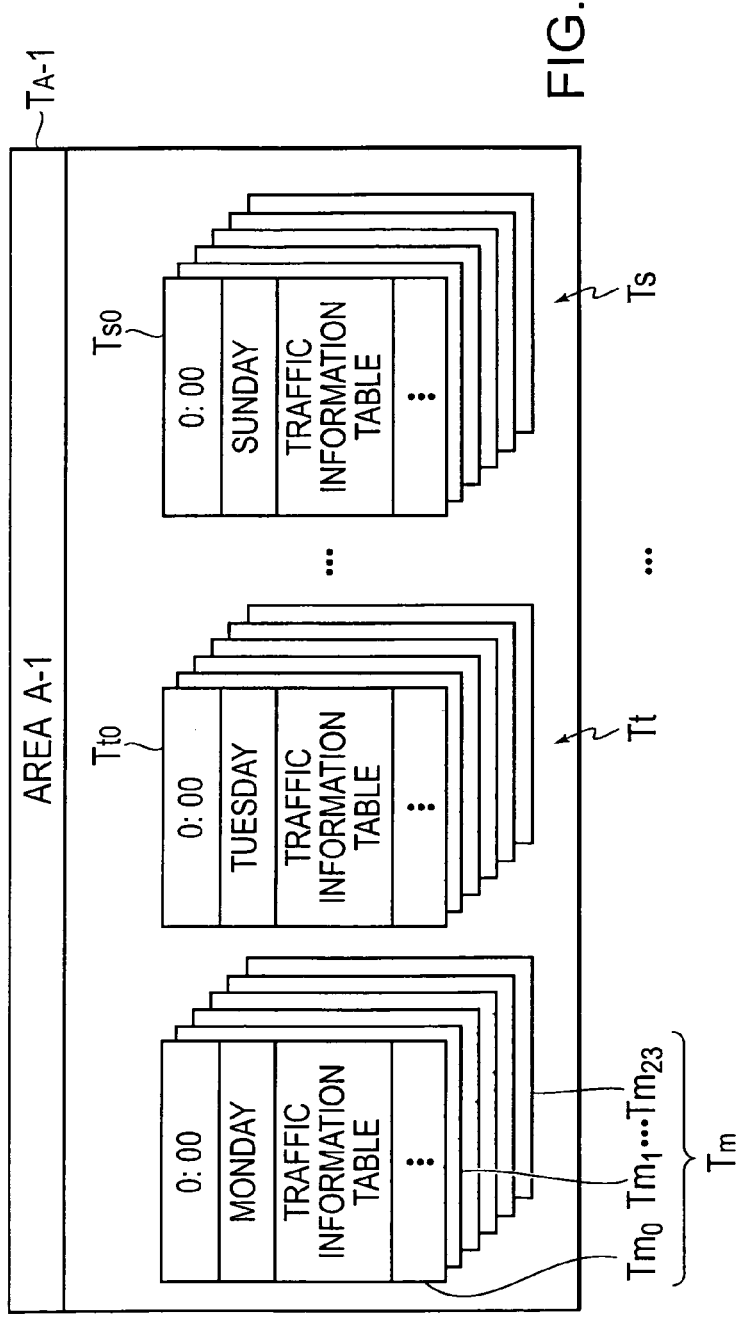
FIG. 7 is a diagram showing a traffic information table.
Figure 8:
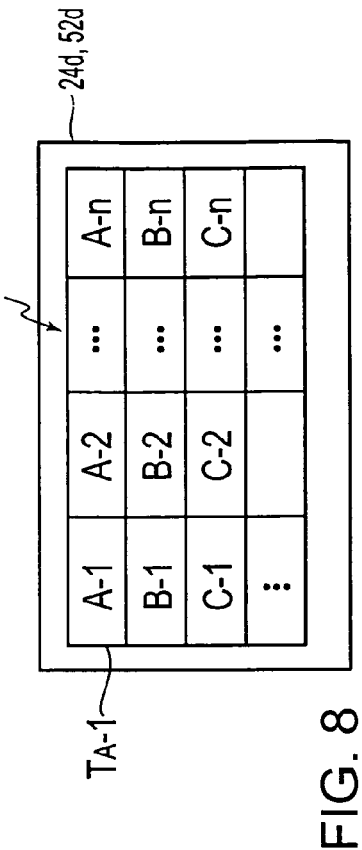
FIG. 8 is a diagram showing a total traffic information table.

Specifically, for example, a traffic information table $T_A$-1 for an area A-1 is produced as shown in FIG. 7. As shown in FIG. 7, the traffic information table $T_A$-1 for the area A-1 may include seven traffic information tables Tm to Ts for the respective seven days of the week from Monday to Sunday. Each of the traffic information tables Tm to Ts may include traffic information tables for respective time periods. Specifically, the traffic information table Tm for Monday may include traffic information tables $Tm_0$ to $Tm_{23}$ produced every hour from 0 o'clock to 23 o'clock. Similarly, the traffic information tables Tt to Ts for Tuesday to Sunday each may include traffic information tables produced every hour from 0 o'clock to 23 o'clock. Those traffic information tables may form a total traffic information table Ta as shown in FIG. 8.

The produced total traffic information table Ta may be stored as traffic information table data 24d in the data storage unit 24 of the navigation apparatus 10, as shown in FIG. 3. The total traffic information table Ta may also be stored as traffic information table data 51d in the data storage unit 51 of the navigation center 51. When the traffic information table data 24d and 51d have been stored in advance in the navigation apparatus 10 and the navigation center SC, a route search process may be performed by the navigation apparatus 10.

Figure 9:
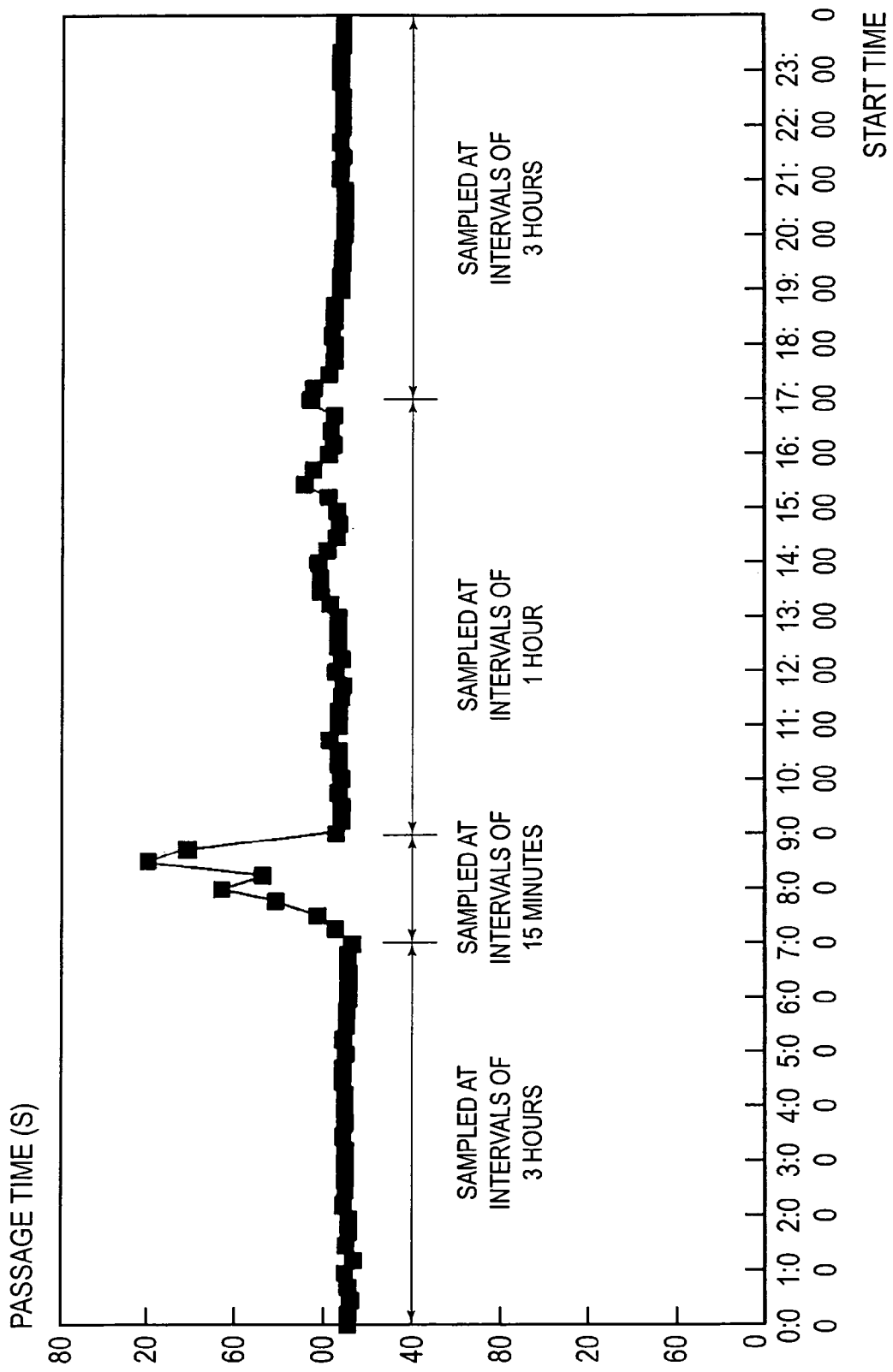
FIG. 9 is a graph showing a necessary time varying depending on a start time.

In the statistically predicted traffic information data 24c of the navigation apparatus 10 and also in the statistically predicted traffic information data 51c of the navigation center SC, predicted traffic information may be described for a link within an area and for each time period whose length is selected depending on the time needed to pass through the link. The time needed to pass through a link varies in 24 hours. FIG. 9 is a graph showing an example of the time needed to pass through a link on a certain day, wherein the time needed to pass through the link is plotted as a function of the start time. In this specific example, no significant change occurs in time needed to pass through the link in a time period from 0 o'clock to 7 o'clock and from 17 o'clock to 24 o'clock, and a rather small change occurs in a time period from 9 o'clock to 17 o'clock. In contrast, a large change occurs in time period from 7 o'clock to 9 o'clock. In other words, the traffic information is substantially equal in time periods from 0 o'clock to 7 o'clock and from 17 o'clock to 24 o'clock. The time needed to pass through the link in those time periods is substantially equally calculated, regardless of which predicted traffic information in those time periods is used, without causing a significant error. On the other hand, to calculate the accurate time needed to pass through the link in the time period in which a large change occurs, it is needed to use predicted traffic information precisely corresponding to the actual start time. Therefore, to handle the large change in such a time period, predicted traffic information may be prepared at short intervals properly determined depending on the degree of change. On the other hand, in time periods in which no significant change occurs in time needed to pass through the link, predicted traffic information may be prepared by sampling data at longer intervals.

Specifically, in this specific example, predicted traffic information may be produced from data sampled at intervals of 3 hours in the time period from 0 o'clock to 7 o'clock and also in the time period from 17 o'clock to 24 o'clock, at intervals of 15 minutes in the time period from 7 o'clock to 9 o'clock, and at intervals of 1 hour in the time zone from 9 o'clock to 17 o'clock. The result may be stored as the statistically predicted traffic information data 24c and the statistically predicted traffic information data 51c. The time periods, during which data is sampled at predetermined intervals, are not limited to those described above, but they may be properly determined as required. The sampling at intervals properly selected depending on the time zone makes it possible to reduce the data size of the statistically predicted traffic information data 24c and 51c.

Figure 10:
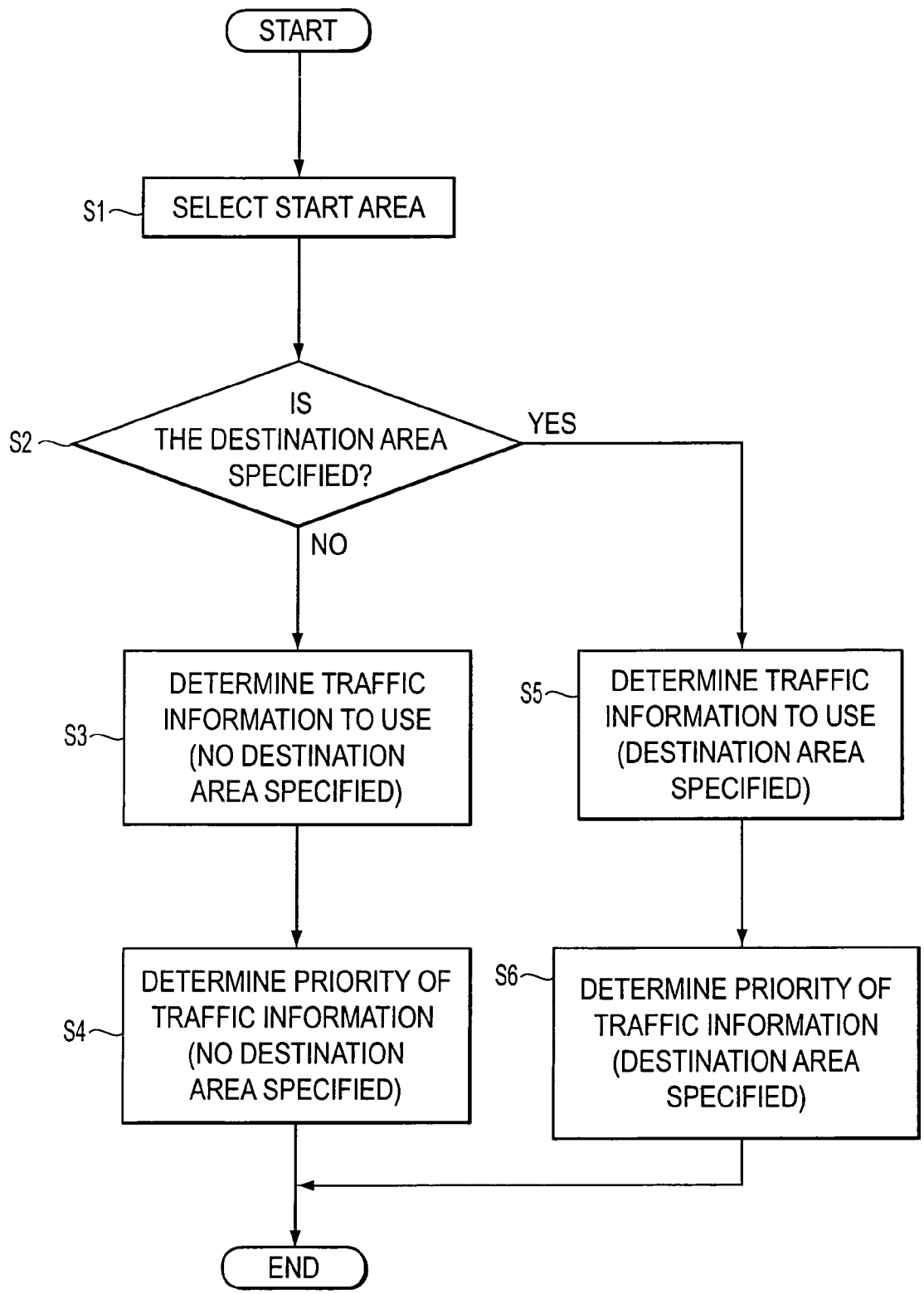
FIG. 10 is a flow chart showing a process of producing a table according to an exemplary embodiment of the invention.

The operation of the navigation system 1 is described in further detail below with reference to FIGS. 10-12. First, as shown in FIG. 10, the navigation server 50 in the navigation center SC may produce tables in advance.

The whole area of Japan is divided into an array of areas in the form of a mesh or parcels, and identification numbers such as A-1 or B-1 are assigned to respective areas (e.g., FIG. 5). Those areas obtained by dividing the whole area are referred to as traffic information service areas. In other words, the traffic information service areas are areas included in an area within which searching for a route is possible. One of those areas is selected as a start area (step S1). Thereafter, it is determined whether a destination area is specified for the start area determined in step S1 (step S2).

If no area is specified as the destination area (that is, the answer to step S2 is no), traffic information is determined for use in the situation in which no destination area is specified (step S3). According to the present exemplary embodiment, the necessary times $t_1$ and $t_2$ from the start area to each traffic information service area are calculated as the traffic information to be used. Specifically, the necessary times $t_1$ and $t_2$ are determined such that various routes from a point in the area specified as the start area to a point in each traffic information service area are drawn, the averages of necessary times along the routes are calculated for $t_1$ and $t_2$, and the results are employed as the necessary times $t_1$ and $t_2$.

In the calculation of the necessary times $t_1$ and $t_2$, data obtained by time-sliding the statistically predicted traffic information data 51c (61c) is used. The necessary time $t_1$ for roads (general roads) other than toll roads and the necessary time $t_2$ for toll roads are separately calculated. Thereafter, the usage priority levels for the case in which no destination area is specified are determined (step S4). The determination of the usage priority levels is made on the basis of the distance from the start area and the necessary times $t_1$ and $t_2$ from the start area. For areas in which there are no toll roads, the necessary time $t_2$ and the usage priority level $n_2$ are not calculated.

If a destination area is specified (the answer to step S2 is yes), traffic information, that is, the necessary time $t_1$ and $t_2$ is determined for use in the situation in which a specific destination area is specified (step S5). Specifically, the necessary times $t_1$ and $t_2$ are determined such that various routes from a point in the start area to a point in the destination area are drawn, the averages of travel times along the routes are calculated for $t_1$ and $t_2$, and the results are employed as the necessary times $t_1$ and $t_2$. For areas that are not passed through by any route from the start area to the destination area, the necessary times $t_1$ and $t_2$ calculated as in step S3 for use in the situation in which no destination area is specified are employed as the traffic information to be used.

Thereafter, the usage priority levels are determined for the case in which a particular destination area is specified (step S6). The usage priority levels are determined in a similar manner to the case in which no destination area is specified, taking into account the possibility that routes to the destination area pass through areas and also taking into account the distance from routes to each area.

According to the present exemplary embodiment, the table production process is performed for all areas into which the whole area of Japan is divided. For each area, the table is produced for each time period of each day of the week. That is, the process from step to S6 is performed for each area, and the process from S2 to S6 is performed for each specified time period of each day of the week for each area. The traffic information table is produced for each area included in the whole area of Japan and for each time period of each day of the week. That is, as many traffic information tables T as the number of areas included in the whole area of Japan multiplied by the number of time intervals multiplied by the number of days of the week. The produced total traffic information table Ta (e.g., FIG. 7) may be stored as the traffic information table data 24d in the data storage unit 24 of the navigation apparatus 10 or as the traffic information table data 51d in the data storage unit 51 of the navigation center 51.

Figure 11:
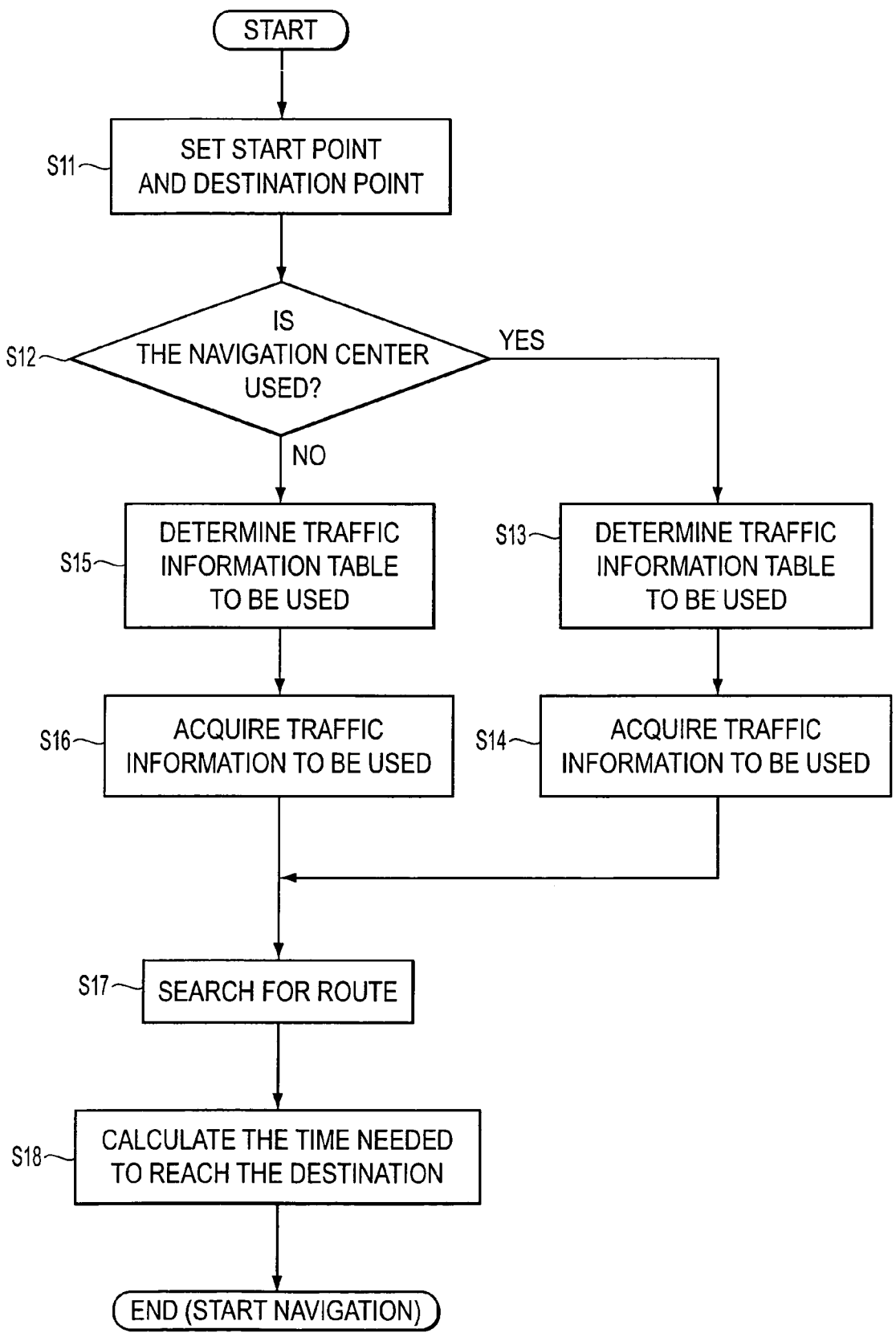
FIG. 11 is a flow chart showing a route search process according to an exemplary embodiment of the invention.
Figure 12:
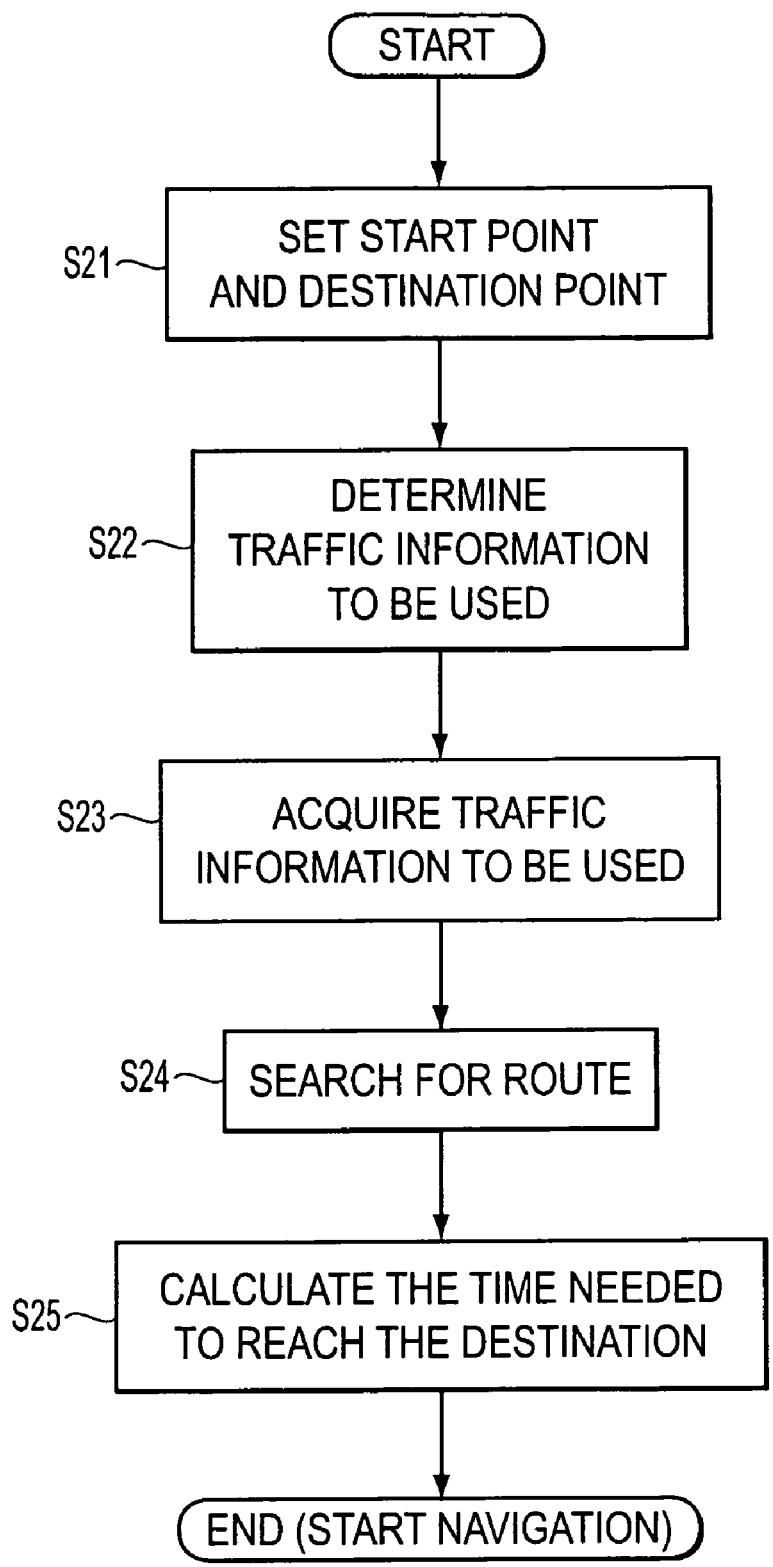
FIG. 12 is a flow chart showing a route search process according to an exemplary embodiment of the invention.

Thereafter, as shown in FIGS. 11 and 12, a route search process is performed using the total traffic information table Ta produced in the table production process, as described below.

First, as shown in FIG. 11, a start area and a destination area are set in the navigation apparatus 10 (step S11). An area including a current position detected by the current location detector 12 or a current position input by a user may be employed as the start area. When a destination is specified, the destination is input by the user and an area including the specified destination is employed as the destination area. Furthermore, a time at which the destination is set is employed as a start time.

Thereafter, it is determined whether the navigation center is used (step S12). In this step, the determination is made depending on whether traffic information tables T associated with areas to be subjected to searching are included in the traffic information table data 24d stored in the data storage unit 24 of the navigation apparatus 10. When the user wants to acquire newest traffic information in which a recent change in traffic condition such as the advent of a new interchange is reflected, the user inputs a command to specify that the navigation center SC should be used.

If it is determined that the navigation center SC should be used (that is, the answer to step S12 is yes), a traffic information table T to be used is selected from the traffic information table data 51d stored in the navigation SC, in accordance with the start point, the start time, and the day of the week (step S13). The traffic information table T selected in this step is also referred to simply as the table to be used. Thereafter, on the basis of the necessary time (or the arrival time) needed to reach areas included in the traffic information table T selected in step S13, predicted traffic information associated with links in those areas is acquired from the statistically predicted traffic information data 51c (step S14).

If it is determined that the navigation center SC is not used (that is, if the answer to step S12 is no), a traffic information table T to be used is selected from the traffic information table data 24d stored in the data storage unit 24 of the navigation apparatus 10 in accordance with the start point, the start time, and the day of the week (step S15). The traffic information table T selected in this step is also referred to simply as the table to be used. Thereafter, on the basis of the travel time (or the arrival time) needed to reach arbitrary areas included in the traffic information table T selected in step S15, predicted traffic information associated with links in those areas is acquired from the statistically predicted traffic information data 24c (step S16).

After the predicted traffic information to be used is acquired in step S14 or S16, a route search process is performed to determine a route (step S17). Searching for the route is performed using the acquired predicted traffic information associated with the respective areas taking into account the usage priority levels (e.g., FIG. 3) of the respective areas indicated in the traffic information table T. During the route search of data associated with the respective areas described in the traffic information table T, only data having a particular usage priority level may be used. For example, when a user wants to detect passable routes over a wide region, data with low usage priority levels is incorporated into the data used.

In the navigation apparatus 10, as described above, predicted traffic information associated with links in the respective areas is acquired on the basis of the stored traffic information tables T. Thereby, highly reliable information indicating the states of the areas at times when the areas are actually passed through. The score may then be calculated for each area, and the overall score from the start area to the destination area or to another area may be calculated by making area-to-area connections and adding the score for each connected area. A route is then searched for taking into account the calculated overall score. It is not necessarily needed that the overall scores from the start area to the destination area or to any other areas be calculated only on the basis of the necessary times. For example, the overall scores may be determined under the condition that the cost is highly weighted. The necessary time from the start area along the route determined in step S17 is calculated (step S18). In this calculation, the necessary time is calculated using the data described in the traffic information table T used in the searching of the route.

When data such as a start point and/or a destination is input using a personal computer 2 installed at a user's home H or using a portable telephone, the route search process is performed according to a flow chart shown in FIG. 12. In this case, the personal computer 2 or the portable telephone selects and acquires a particular traffic information table T used in the route search process from the navigation center SC.

First, as shown in FIG. 12, a user sets a start point and a destination (step S21). Specifically, the user accesses the navigation center SC from the personal computer 2 at the user's home H or from the portable telephone via the network N (see, e.g., FIG. 1). An area including the start point specified by the user is employed as the start area. The start time is the time at which the destination is set.

In the navigation center SC, a traffic information table T to be used is selected from the traffic information table data 51d stored in the data storage unit 51 on the basis of the start point, the start time, and the day of the week, (step S22). The selected traffic information table T is also referred to simply as the table to be used. On the basis of the traffic information table T determined in step S22, predicted traffic information is acquired from the statistically predicted traffic information data 51c stored in the data storage unit 51 (step S23).

After the predicted traffic information is acquired in step S23, a route search is performed to determine a route (step S24). In this step, the route search process is performed in a similar manner to the process shown in FIG. 11. The necessary time along the route determined in step S24 is then calculated (step S25).

In the navigation apparatus 10 according to the present exemplary embodiment, as described above, the traffic information table T to be used are first determined on the basis of the start area, the start time, and the day of the week. Then, on the basis of the necessary time (or the arrival time) from the start area described in the traffic information table T, predicted traffic information associated with links in each area is acquired, and route searching is performed using the acquired predicted traffic information.

According to known navigation systems, traffic information may be acquired in real time repeatedly as the vehicle travels, and the route search process may be performed using the traffic information obtained in real time. Therefore, it is possible to search for a route in a manner in which current traffic information is reflected. However, these known navigation systems can only obtain current data for an area close to a point where searching is performed, and data for other areas and/or at other times cannot be obtained. Therefore, when a route from the start point (at which searching for a route is performed) to another point or a destination point is searched for, route searching utilizing traffic information is possible only at the start point.

In contrast, in the present exemplary embodiment, the traffic information (in the current state) about the start area and predicted traffic information for respective areas are acquired. Thus, route searching utilizing traffic information is possible not only in the start area but also in all other areas, and searching may be performed in a shorter time than is required in above-described known navigation systems in which searching utilizing traffic information is possible only in the start area. Note that, according to the present embodiment, the predicted traffic information used in the respective areas is highly reliable, because a change in traffic condition, which can occur with the passage of time from the start time to the arrival time, is reflected in the predicted traffic information, and a change that can occur depending on the day of week is also reflected. Thus, the navigation apparatus 10 according to the present exemplary embodiment is capable of performing high-precision route searching in a short time.

In summary, in the present exemplary embodiment, the data storage unit 24 of the navigation apparatus 10 can store the total traffic information table Ta. The total traffic information table Ta can include a plurality of traffic information tables T in which the necessary time (or the arrival time) needed for a traveling from each area included in the whole area of Japan to another area. The search unit 35b of the CPU 25 can select a traffic information table T to be used which includes an area as a start area in which the current position is located and which corresponds to a start time. Furthermore, the search unit 35b of the CPU 25 can acquire predicted traffic information corresponding to the necessary time for each of the areas described in the selected traffic information table. The search unit 35b may then perform route searching using the acquired predicted traffic information.

As described above, because the necessary time from a start area to another area may be calculated for each area included in the whole of Japan as the start area, route searching may be performed using the predicted traffic information corresponding to the calculated necessary time. That is, searching for a route from the start area to another area or areas may be performed on the basis of the predicted traffic information indicating a current traffic condition of the start area and the predicted traffic information indicating a traffic condition very likely to occur at a time when the other area or areas will be passed through. Thus, route searching is performed in a highly reliable fashion taking into account a change in traffic condition that can occur with passage of time.

According to the present exemplary embodiment, in the traffic information tables T stored in the navigation apparatus 10, the usage priority level of an area for each start area may be described. This makes it possible to perform route searching that takes the usage priority level of each area into account.

According to the present exemplary embodiment, the CPU 25 of the navigation apparatus 10 can select areas having a particular usage priority level from the data described in the traffic information table T and can perform the route searching by using only the selected areas. That is, data which is not very important (having a low priority) may not be used in the route searching, and thus the amount of data used may be reduced, and it becomes possible to perform the route searching in an efficient manner.

According to the present exemplary embodiment, the traffic information tables T that can be stored in the navigation apparatus 10 may include traffic information associated with each day of the week. This makes it possible to perform route searching taking into account a change in traffic conditions that can occur depending on the day of the week, and thus it becomes possible to obtain a highly-reliable result from route searching.

According to the present exemplary embodiment, the traffic information tables T stored in the navigation apparatus 10 may be produced separately for each road type (general roads and toll roads). This makes it possible to perform route searching separately for each road type.

According to the present exemplary embodiment, the search unit 35b of the CPU 25 is capable of selecting a traffic information table T to be used from the traffic information tables T that may be stored in the data storage unit 51 of the navigation center SC (with which the navigation apparatus 10 is capable of communicating via the network N). That is, the search unit 35b of the CPU 25 is capable of acquiring a traffic information table T that may not be stored in the navigation apparatus 10. For example, when the traffic information table data 24d stored in the navigation apparatus 10 does not include necessary data associated with a particular area, or when it is desirable to acquire the newest data or more detailed data, it is possible to acquire such a traffic information table T from the navigation center SC. This makes it possible to perform route searching over a wide region in a highly reliable fashion.

According to the present exemplary embodiment, the predicted traffic information stored in the navigation apparatus 10 may be obtained by performing sampling at intervals that are varied depending on time periods such that the intervals are reduced for time periods in which a great change occurs in time needed to pass through an arbitrary link. According to the present exemplary embodiment, the intervals may be increased for time zones in which no significant change occurs in time needed to pass through the link. As a result, a small amount of predicted traffic information may be associated with time periods in which no significant change in time needed to pass through links occurs. Thus, by properly determining sampling intervals depending on the degree of change in time needed to pass though links, it becomes possible to reduce the data size of the predicted traffic information stored in the navigation apparatus 10 without resulting in substantially decreased reliability of the route search process.

According to the present exemplary embodiment, the navigation system 1 may include the navigation apparatus 10 and the navigation center SC. The navigation apparatus 10 is capable of accessing the navigation center SC via the network N, and the navigation center SC is capable of producing traffic information tables indicating predicted traffic information for respective areas in the whole area of Japan. The traffic information tables produced by the navigation center SC can be stored in the navigation apparatus 10 and the navigation center SC. Thus, in the navigation system 1, it is possible to produce traffic information tables indicating predicted traffic information for respective areas in the whole area of Japan.

However, it should be appreciated that the exemplary embodiment described above may by modified, for example, as follows.

In the exemplary embodiment described above, the traffic information table T is produced and stored for each area obtained by dividing a given particular area. The given particular area is the whole area of Japan in the exemplary embodiment described above. However, the particular area may not be limited to the whole area of Japan. It may be an area of a prefecture, a city, a town, a village, or any other area.

In the exemplary embodiment described above, the whole area of Japan, given as the particular area, may be divided in the manner described in FIG. 5. However, the area may be divided in any other arbitrary manner. Additionally, the size of areas obtained by dividing the particular area may be properly selected as required. For example, the required map scale depends on a location in the whole area of Japan and on whether a route covers a long distance or a short distance within, for example, a town. When a route covers a long distance, traffic information tables produced for large areas may be advantageously used. On the other hand, when a route is within a town or the like, traffic information tables may be produced for small areas.

In the exemplary embodiment described above, the traffic information tables T may be produced every hour and every day of the week. However, there is no particular limitation on the intervals at which the traffic information tables T are produced. For example, the traffic information tables T may be produced only at a particular time of a day or may be produced at intervals shorter than one hour. Instead of producing the traffic information tables T for each day of the week, the traffic information tables T may be produced, for example, for weekday, weekends, or national holidays, and/or for each season.

In the exemplary embodiment described above, as shown in FIG. 9, the statistically predicted traffic information data 24c or 51c may be produced such that traffic information is obtained at shorter intervals for time periods in which a great change in traffic conditions occur. However, the manner of producing the statistically predicted traffic information data may be determined properly depending on traffic conditions that can be influenced by various factors. For example, a great change in traffic condition can occur on weekends, or in a winter or summer holiday season. If this is the case, the statistically predicted traffic information data 24c or 51c may be produced such that such a change in traffic condition is reflected in the data.

In the exemplary embodiment described above, the navigation apparatus 10 can access the navigation center SC via the network N to acquire traffic information tables T or traffic information described in traffic information tables T. However, the server accessible by the navigation apparatus 10 is not limited to the navigation center SC. For example, when the navigation apparatus 10 cannot acquire necessary information from the data stored in the navigation apparatus 10 and from the data stored in the navigation center SC, the navigation apparatus 10 may access another server via, for example, the network N and/or any other communication means to acquire necessary information.

In the exemplary embodiment described above, the traffic information tables T may include information indicating the usage priority levels of roads in each area. However, the usage priority levels are not necessarily needed.

In the exemplary embodiment described above, each traffic information table T may include information associated with general roads and toll roads. Alternatively, each traffic information table T may include information associated with only one of general roads or toll roads. However, each traffic information table T may include information associated with one or more additional type of roads.

In the exemplary embodiment described above, each traffic information table T includes information used when a particular destination area is specified. However, each traffic information table T does not necessarily need to include information used in the situation in which a particular destination area is specified. If the traffic information tables T include only information for use in the situation in which no destination area is specified, it is possible to reduce the data size of the traffic information table data 24d or 51d.

In the embodiment described above, the traffic information tables T may include information depending on the day of the week. Alternatively, the traffic information tables T may include information indicating, for example, the road surface condition, the number of lanes, the road width, and/or information that can vary depending on the season or weather. This makes it possible to store data in an efficient manner depending on the required condition, and it is possible to perform high-precision route searching using the stored data.

In the exemplary embodiment described above, route searching may be performed using predicted traffic information. In addition to the predicted traffic information, current traffic information received via the VICS receiver 19 may be used in the route searching as well. If traffic information received via the VICS receiver 19 includes restriction information indicating, for example, that a particular road is closed to traffic until a particular time or that the maximum allowable vehicle speed is limited to a particular value during a particular period of time, the period of time during which traffic is restricted may be compared with the time needed to reach an area subjected to the traffic restriction from a start area, and it can be determined whether to take into account the restriction information.

Figure 13:
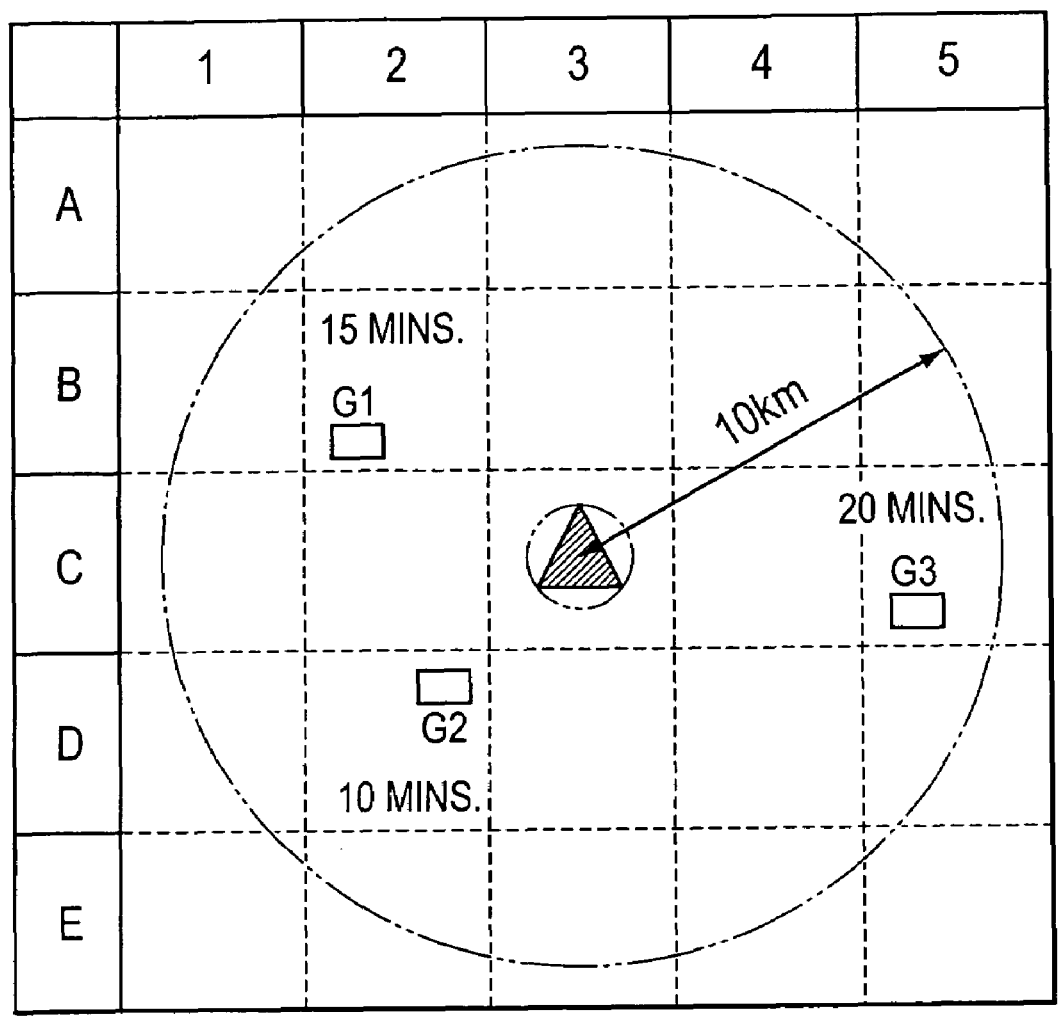
FIG. 13 is a diagram showing another example of a route search process.

In the exemplary embodiment described above, the traffic information tables T may be produced such that the navigation apparatus 10 is capable of searching for a route from a current position to a destination by using the traffic information tables T. The traffic information tables T may be produced such that the navigation apparatus 10 is also capable of searching for a particular facility (such as a hotel or a rest stop). For example, when particular facilities located in an area with a radius of 10 km are searched for by using the navigation apparatus 10 as shown in FIG. 13, the searching may be performed as follows. First, a user inputs a facility to search for. In response, the CPU 25 searches for facilities, and areas in which detected facilities are located are determined as areas to be subjected to the route search process. Specifically, as shown in FIG. 13, facilities G1, G2, and G3 are detected, and areas B-2, D-2, and C-5 in which the respective facilities G1, G2, and G3 are located are employed as areas to be subjected to the route search process. Herein the CPU 25 may serve as the search means and as the area determination means.

Thereafter, the search unit 35b (table selection means) selects, as the start area, the area in which the current position is located, and selects, as the table to be used, a traffic information table corresponding to the start time from the traffic information table data 24d (stored in the table storage means). The necessary times (or arrival times) to the areas B-2, D-2, and C-5 in which the facilities G1, G2, and G3 are located are displayed on the display 16 (output means). In the specific example shown in FIG. 13, the necessary times to the areas B-2, D-2, and C-5 are 15 min, 10 min, and 20 min, respectively. Thus, a user is informed of the necessary times needed to reach the facilities from the current position. Because, in this example, only the necessary times to the areas in which the specified facilities are located are displayed on the display 16, the user can more easily recognize the necessary times needed to reach the facilities than when necessary times are displayed in all areas.

Accordingly, the user can select a particular facility in a particular area by evaluating the necessary times (or the arrival times) needed to get to the respective areas from the start area, and can search for a route to the area as the destination area, for example, in a similar manner as described above with reference to the exemplary embodiment.

While features of this invention have been described in conjunction with the exemplary embodiments outlined above, various alternatives, modifications, variations, and/or improvements may be possible. Accordingly, the exemplary embodiments of the invention, as set forth above, are intended to be illustrative. Various changes may be made without departing from the spirit and scope of the invention.

What is claimed is:

1. A navigation apparatus, comprising:
   at least one memory that:
   stores a plurality of traffic information tables, the traffic information tables including a length of time required to travel from a predefined one of a plurality of predefined traffic information service areas to each remaining one of the plurality of predefined traffic information service areas, or an arrival time at the each remaining one of the plurality of predefined traffic information service areas, during one of a plurality of first predefined time periods; and stores, for each of a plurality of second predefined time periods, predicted traffic information associated with each of at least one link within each predefined traffic information service area; and at least one controller that:

selects a traffic information table from the plurality of traffic information tables, wherein the selected traffic information table includes as the predefined one of the plurality of predefined traffic information service areas a predefined traffic information service area containing a starting point and the selected traffic information table corresponds to one of the plurality of first predefined time periods in which traveling will start; and searches for a route from the starting point to a destination using the predicted traffic information, wherein the predicted traffic information is associated with each of the at least one link within any one of the plurality of predefined traffic information service areas and the predicted traffic information is acquired based on the length of time or the arrival time included in the selected traffic information table.

2. The navigation apparatus of claim 1, wherein in the plurality of traffic information tables, a usage priority level is associated with each of the plurality of predefined traffic information service areas and each usage priority level associated with each of the plurality of predefined traffic information service areas depends on which one of the plurality of predefined traffic information service areas contains the starting point.

3. The navigation apparatus of claim 2, wherein, when a certain predefined traffic information service area contains the starting point, the at least one controller only searches for routes using ones of the plurality of predefined traffic information service areas that have a certain priority level corresponding to the certain predefined traffic information service area containing the starting point.

4. The navigation apparatus of claim 1, wherein the first predefined time periods are days of the week.

5. The navigation apparatus of claim 1, wherein predicted traffic information is separately stored for each of a plurality of road types.

6. The navigation apparatus of claim 1, wherein the predicted traffic information associated with any of the at least one links within each predefined traffic information service area is obtained by sampling traffic data at least one interval within a corresponding one of the second predefined time periods, and, for each of the at least one intervals, the length of the interval is inversely proportional to the change in traffic congestion during that interval.

7. The navigation apparatus of claim 1, wherein the at least one controller selects the traffic information table from a separate plurality of traffic information tables, the separate plurality of traffic information tables stored in a remote server.

8. The navigation apparatus of claim 7, wherein the predicted traffic information associated with any of the at least one links within each predefined traffic information service area is obtained by sampling traffic data at least one interval within a corresponding one of the second predefined time periods, and, for each of the at least one intervals, the length of the interval is inversely proportional to the change in traffic congestion during that interval.

9. The navigation apparatus of claim 1, wherein the starting point is the current position of the navigation apparatus.

10. The navigation apparatus of claim 1, wherein the starting point is defined by a user of the navigation apparatus.

11. A navigation system, comprising:

the navigation apparatus of claim 1; and at least one controller that produces a plurality of traffic information tables, wherein each of the produced traffic information tables includes a length of time required to travel from a predefined one of a plurality of predefined traffic information service areas to each remaining one of the plurality of predefined traffic information service areas during one of a plurality of predefined time periods and the plurality of traffic information tables are stored in the at least one memory.

12. A method for searching for a route, comprising:

producing a plurality of traffic information tables, wherein each of the produced traffic information tables includes a length of time required to travel from a predefined one of a plurality of predefined traffic information service areas to each remaining one of the plurality of predefined traffic information service areas, or an arrival time at the each remaining one of the plurality of predefined traffic information service areas, during one of a plurality of first predefined time periods;

storing, for each of a plurality of second predefined time periods, predicted traffic information associated with each of at least one link within each predefined traffic information service area in a memory;

selecting a traffic information table from the plurality of produced traffic information tables, wherein the selected traffic information table includes as the predefined one of the plurality of predefined traffic information service areas a predefined traffic information service area containing a starting point and the selected traffic information table corresponds to one of the plurality of first predefined time periods in which traveling will start; and searching for a route from the starting point to a destination using the predicted traffic information, wherein the predicted traffic information is associated with each of the at least one link within any one of the plurality of predefined traffic information service areas and the predicted traffic information is acquired based on the length of time or the arrival time included in the selected traffic information table.

13. The method for searching for a route of claim 12, further comprising storing the plurality of produced traffic information tables.

14. A computer-readable storage medium storing a set of program instructions executable on a data processing device and usable for searching for a route, the set of program instructions comprising:

instructions for producing a plurality of traffic information tables, wherein each of the produced traffic information tables includes a length of time required to travel from a predefined one of a plurality of predefined traffic information service areas to each remaining one of the plurality of predefined traffic information service areas, or an arrival time at the each remaining one of the plurality of predefined traffic information service areas, during one of a plurality of first predefined time periods;

instructions for storing, for each of a plurality of second predefined time periods, predicted traffic information associated with each of at least one link within each predefined traffic information service area;

instructions for storing the plurality of produced traffic information tables in the memory;

instructions for selecting a traffic information table from the plurality of produced traffic information tables, wherein the selected traffic information table includes as the predefined one of the plurality of predefined traffic information service areas a predefined traffic information service area containing a starting point and the selected traffic information table corresponds to one of the plurality of first predefined time periods in which traveling will start; and instructions for searching for a route from the starting point to a destination using the predicted traffic information, wherein the predicted traffic information is associated with each of the at least one link within any one of the plurality of predefined traffic information service areas and the predicted traffic information is acquired based on the length of time or the arrival time included in the selected traffic information table.

15. The navigation apparatus of claim 1, wherein each predefined traffic information service area is a sub-region of a geographical region.

16. The navigation apparatus of claim 15, wherein the route from the starting point to the destination spans multiple predefined traffic service information areas within the geographical region.

17. The navigation apparatus of claim 1, wherein each predefined traffic information service area encompasses an area comprising multiple links and multiple types of links.

\* \* \* \* \*

UNITED STATES PATENT AND TRADEMARK OFFICE
CERTIFICATE OF CORRECTION

PATENT NO. : 7,657,370 B2
APPLICATION NO. : 10/857882
DATED : February 2, 2010
INVENTOR(S) : Nagase et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1416 days.

Signed and Sealed this

Thirtieth Day of November, 2010

David J. Kappos
*Director of the United States Patent and Trademark Office*